United States Patent
Lee et al.

(10) Patent No.: US 6,542,297 B1
(45) Date of Patent: Apr. 1, 2003

(54) HALF MIRROR VARYING APPARATUS FOR THREE-DIMENSIONAL IMAGE DISPLAYING APPARATUS

(75) Inventors: Jung-Hyun Lee, Suwon (KR); Sang-Woo Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/521,432

(22) Filed: Mar. 8, 2000

(30) Foreign Application Priority Data

May 17, 1999 (KR) .............................. 99-17653

(51) Int. Cl.$^7$ .............................................. G02B 27/22
(52) U.S. Cl. ..................... 359/466; 359/872; 348/52; 345/9
(58) Field of Search .................. 359/872, 848, 359/847, 472, 464, 466, 471, 477, 462, 839; 248/488, 476; 348/52, 51, 54; 349/15; 345/108, 7, 9; 362/143

(56) References Cited

U.S. PATENT DOCUMENTS

| | | | |
|---|---|---|---|
| 5,400,183 A | * 3/1995 | Rosser | ........................ 359/872 |
| 5,526,925 A | * 6/1996 | Bernstein | ..................... 206/162 |
| 5,721,586 A | * 2/1998 | Shimamura et al. | .......... 348/61 |
| 5,959,791 A | * 9/1999 | Bagnato | ...................... 359/872 |

* cited by examiner

Primary Examiner—Cassandra Spyrou
Assistant Examiner—Joshua Pritchett
(74) Attorney, Agent, or Firm—Robert E. Bushnell, Esq.

(57) ABSTRACT

A three-dimensional image displaying apparatus includes: a casing; a pair of plates engaged at both sides of the casing and having a guide hole having a certain curvature at upper and lower portions and a fixing hole formed near the guide hole; a pair of support frames engaged at both inner sides of the casing, each having a lower portion engaged at a bottom of the casing by a hinge shaft and an engaging groove formed on an inner surface for thereby fixing a half mirror, said support frames being rotatable along the guide hole in upward and downward directions; and a varying means engaged at upper portions of the support frames for fixing the support frames at a certain angle, whereby it is possible to selectively use the apparatus as a 2D image displaying apparatus and a 3D image displaying apparatus by moving the half mirror upwardly or downwardly.

22 Claims, 6 Drawing Sheets

HALF MIRROR VARYING APPARATUS FOR THREE-DIMENSIONAL IMAGE DISPLAYING APPARATUS

CLAIM OF PRIORITY

This application makes reference to, incorporates the same herein, and claims all benefits accruing under 35 U.S.C. §119 from my application APPARATUS FOR CONTROLLING A HALF MIRROR OF THREE-DIMENSIONS DISPLAY DEVICE filed with the Korean Industrial Property Office on May 17, 1999 and there duly assigned Ser. No. 17653/1999.

BACKGROUND OF THE INVENTION

1. Field of the Invention

The present invention relates to a 3D image displaying apparatus, and in particular to a half mirror varying apparatus for a 3D image displaying apparatus which is capable of selectively implementing a two dimensional and three dimensional image by varying a half mirror in an up and down direction.

2. Description of the Background Art

Generally, a 3D image displaying apparatus is an apparatus capable of displaying a three dimensional image using a visual difference between the images presented to the left and right eyes of a human. 3D image displaying apparatus are generally classified into apparatus using a glass method which uses a special glass, and apparatus using a lenticular method. Among apparatus of the glass method, there are a polarizing glass type, a liquid crystal shutter glass type, and an anaglyph type for thereby implementing a 3D image. In the above-described glass method, it is necessary to wear special glasses, which makes this method inconvenient.

In addition, among apparatus of the lenticular method, there are a direct viewing type in which a lenticular lens sheet is installed on a surface of a displaying apparatus such as a CRT, liquid display panel, etc., and a projection type in which an image is projected onto a lenticular lens sheet using a projector. In the projection-type lenticular method, a half mirror is engaged for projecting an image.

A conventional 3D image displaying apparatus includes a casing, a first image display apparatus engaged at a lower portion of the casing, a second image display apparatus engaged in a vertical direction with respect to the first image display apparatus, a half mirror installed at an angle of 45° with respect to the first and second image display apparatuses, and a pair of support frames for supporting the half mirror.

The pair of the support frames are installed in a diagonal direction at both sides of the casing. The upper and lower ends of the same are engaged to the casing by an engaging screw. A pair of the support frames are formed in a longitudinal rectangular bar shape, and a pair of engaging protrusions are formed on an inner surface of the same in a longitudinal direction for thereby forming an engaging groove. Therefore, both ends of the half mirror are installed into the engaging grooves of the support frames, so that the half mirror is engaged to the casing.

However, in the 3D image displaying apparatus, the half mirror is fixed at a certain angle, the half mirror may be used for only the 3D image displaying apparatus. In addition, in the case that the half mirror is inclined at a certain angle due to an external force, it is difficult to adjust the installation angle of the half mirror because it is fixed, so that it is impossible to correct a certain error.

SUMMARY OF THE INVENTION

It is therefore an object of the present invention to provide an improved half-mirror apparatus for three-dimensional image display.

A further object of the invention is to provide an apparatus which can be used as for 3D or 2D image display.

A still further object of the invention is to provide a half-mirror apparatus in which displacement of the half-mirror from the proper angle can be corrected.

Accordingly, the present invention provides a half mirror fixing apparatus which is capable of selectively using a 3D image displaying apparatus as a 2D or 3D displaying apparatus by varying a half mirror upwardly and downwardly.

To achieve the above objects, there is provided a 3D image displaying apparatus which includes a casing, a pair of plates engaged at both sides of the casing and having a guide hole having a certain curvature at upper and lower portions and a fixing bole formed near the guide hole, a pair of support frames engaged at both inner sides of the casing each having a lower portion engaged at a bottom of the casing by a hinge shaft and an engaging groove formed on an inner surface for thereby fixing a half mirror, said support frames being rotatable along the guide hole in upward and downward directions, and a handle engaged at upper portions of the support frames for fixing the support frames at a certain angle, whereby it is possible to selectively use a 2D image displaying apparatus and a 3D image displaying apparatus by moving the half mirror upward or downward.

The handle includes a rack gear formed at an upper portion of each of the support frames in a vertical direction, a pinion heat rotatably engaged on the inner surfaces of the plates and engaged with the rack gear, and a handle having one end protruded into an interior of the upper portion of the support frame, and the other end protruded to the outside through the guide bole for thereby being inserted into the fixing holes of the plates, whereby the handle is upwardly moved along the guide hole, and the other end of the handle is inserted into the fixing hole, and the pinion gear is rotated at a certain angle for thereby implementing an accurate adjustment.

The support frame includes a cubic space formed in its upper portion of the interior of the same for receiving one end of the handle therein, and a spring is engaged in the interior of the space, and one end of the spring elastically supports one end of the handle, and the other end of the spring elastically supports an inner surface of the cubic space.

The through hole is formed at a center of the pinion gear, and a hole is formed at a certain portion of each of a pair of the plates corresponding to the through hole, so that the handle is integrally engaged with the through hole through the hole, and the pinion gear is rotatable by an adjusting knob.

Additional advantages, objects and features of the invention will become more apparent from the description which follows.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
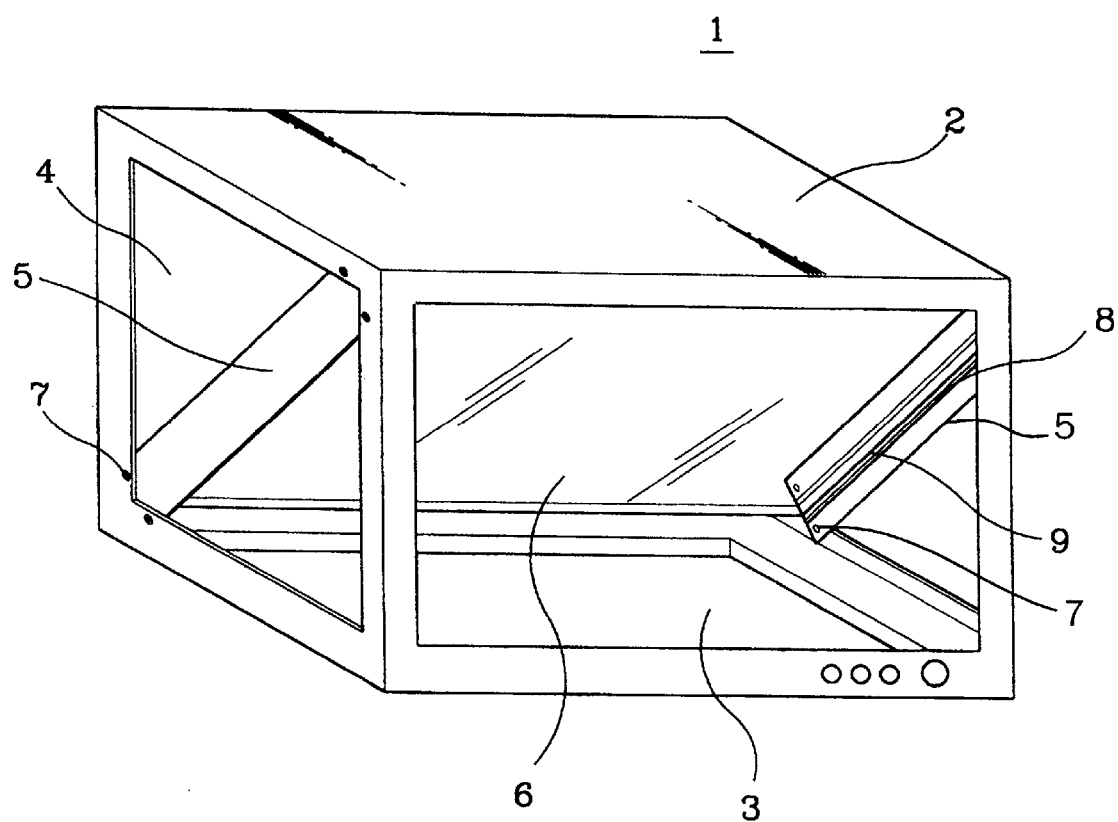
FIG. 1 is a perspective view illustrating a conventional 3D image displaying apparatus.

Turning now to the drawings, FIG. 1 is a perspective view illustrating the conventional 3D image displaying apparatus described above. As shown therein, the 3D image displaying apparatus 1 includes a casing 2, a first image display apparatus 3 engaged at a lower portion of the casing 2, a second image display apparatus 4 engaged in a vertical direction with respect to the first image display apparatus 3, a half mirror 6 installed at an angle of 45° with respect to the first and second image display apparatuses 3 and 4, and a pair of support frames 5 for supporting the half mirror 6.

The pair of the support frames 5 are installed in a diagonal direction at both sides of the casing 2. The upper and lower ends of the same are engaged to the casing 2 by an engaging screw 7. A pair of the support frames 5 are formed in a longitudinal rectangular bar shape, and a pair of engaging protrusions 8 are formed on an inner surface of the same in a longitudinal direction for thereby forming an engaging groove 9. Therefore, both ends of the half mirror 6 are installed into the engaging grooves 9 of the support frames 5, so that the half mirror 6 is engaged to the casing 2.

Figure 2:
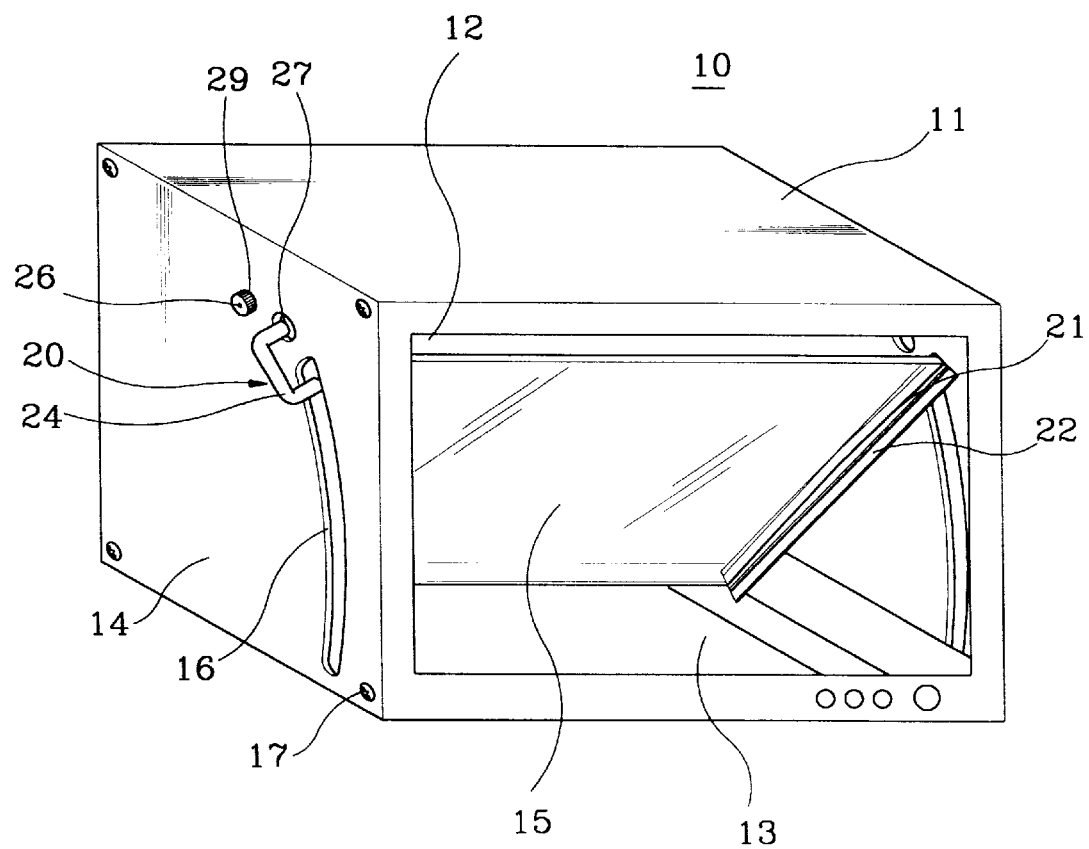
FIG. 2 is a perspective view illustrating a 3D image displaying apparatus and a varying apparatus of a half mirror engaged at the 3D image displaying apparatus according to the present invention.
Figure 3:
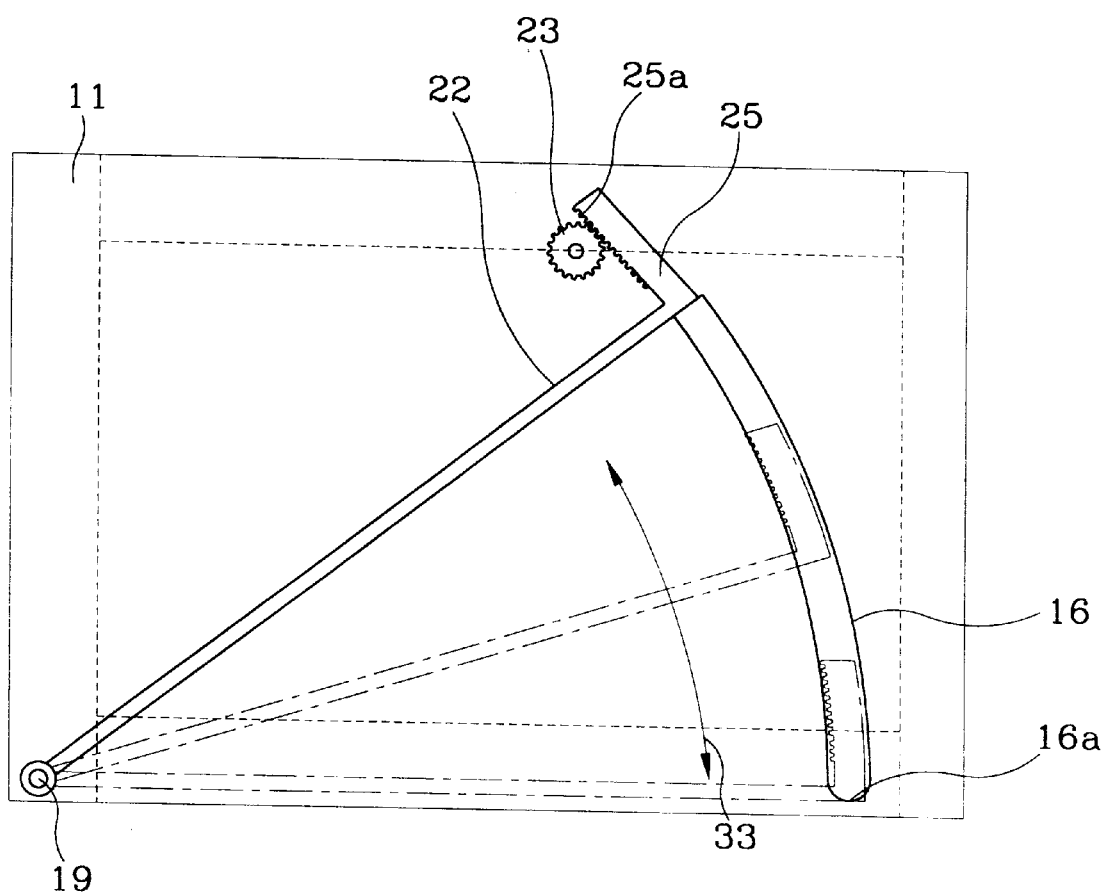
FIG. 3 is an operation state view illustrating an operation state of a varying apparatus for a half mirror engaged at a 3D image displaying apparatus according to the present invention.

The embodiments of the present invention will now be explained with reference to the accompanying drawings. As shown in FIGS. 2 and 3, the 3D image displaying apparatus 10 includes a casing 11, a first image display apparatus 13 engaged at a lower portion of the casing 11, a second image display apparatus 12 engaged in a vertical direction with respect to the first image display apparatus 13, a pair of plates 14 engaged at both sides of the casing 11 and each having a guide hole and a fixing hole 27 near the guide hole 16, a pair of support frames 22 engaged at both inner sides of the casing 11 for fixing the half mirror 15 and being movable upwardly and downwardly along the guide hole 16, and a fixing member 20 for fixing the support frames 22.

The plates 14 are engaged at both sides of the casing 11 by an engaging screw 17, and a guide hole 16 having a certain curvature is formed at each plate 14. In addition, a fixing hole 27 is formed at a portion spaced-apart in an upward direction from the guide hole 16.

A pair of the support frames 22 are formed in a longitudinal rectangular bar, and a pair of engaging protrusions are formed on an inner surface in a longitudinal direction for thereby forming an engaging groove 21. In addition, both ends of the half mirror 15 are inserted into the engaging groove 21. Therefore, the half mirror 15 is fixed at a pair of the support frames 22.

Figure 4:
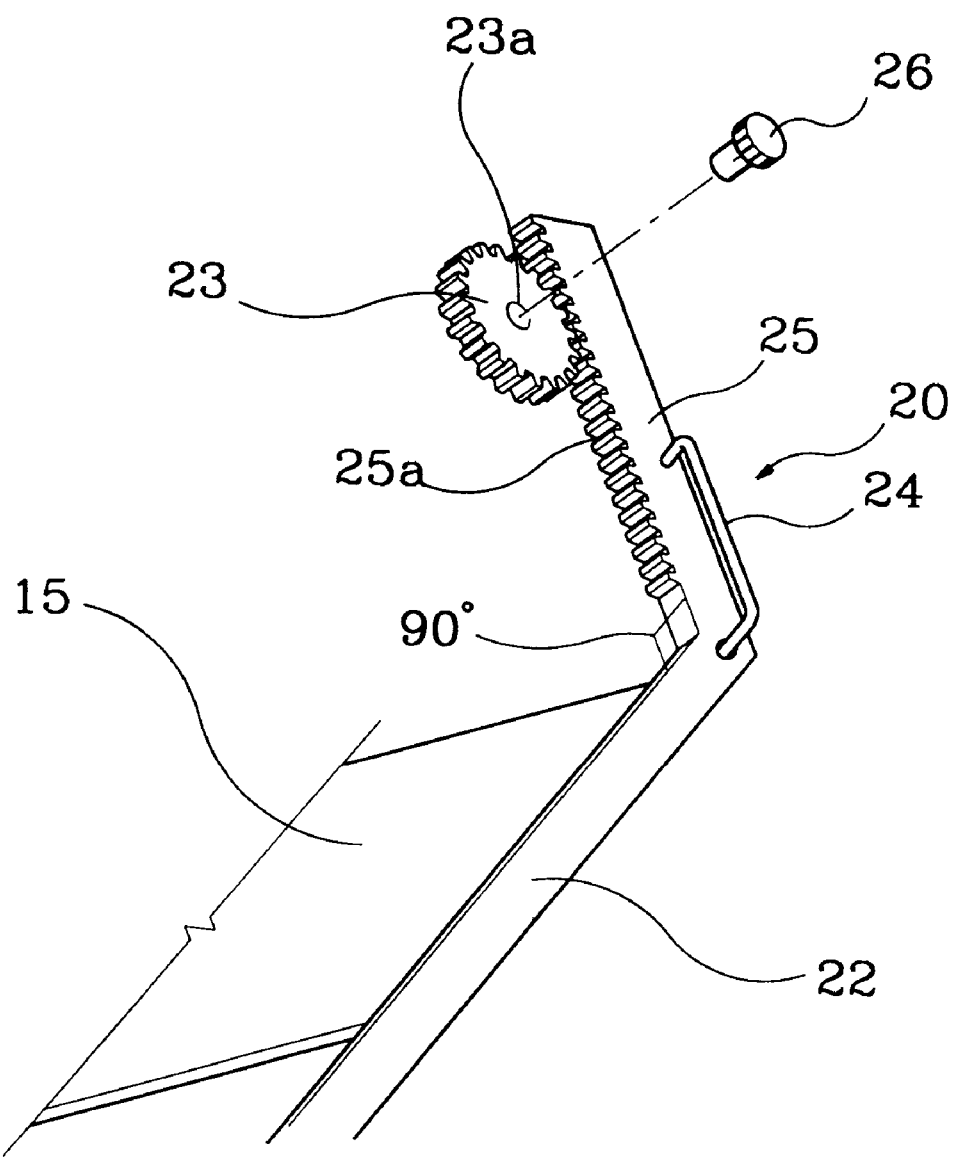
FIG. 4 is an enlarged perspective view illustrating a state that a rack gear and pinion gear of a varying apparatus of a half mirror are engaged according to the present invention.
Figure 5:
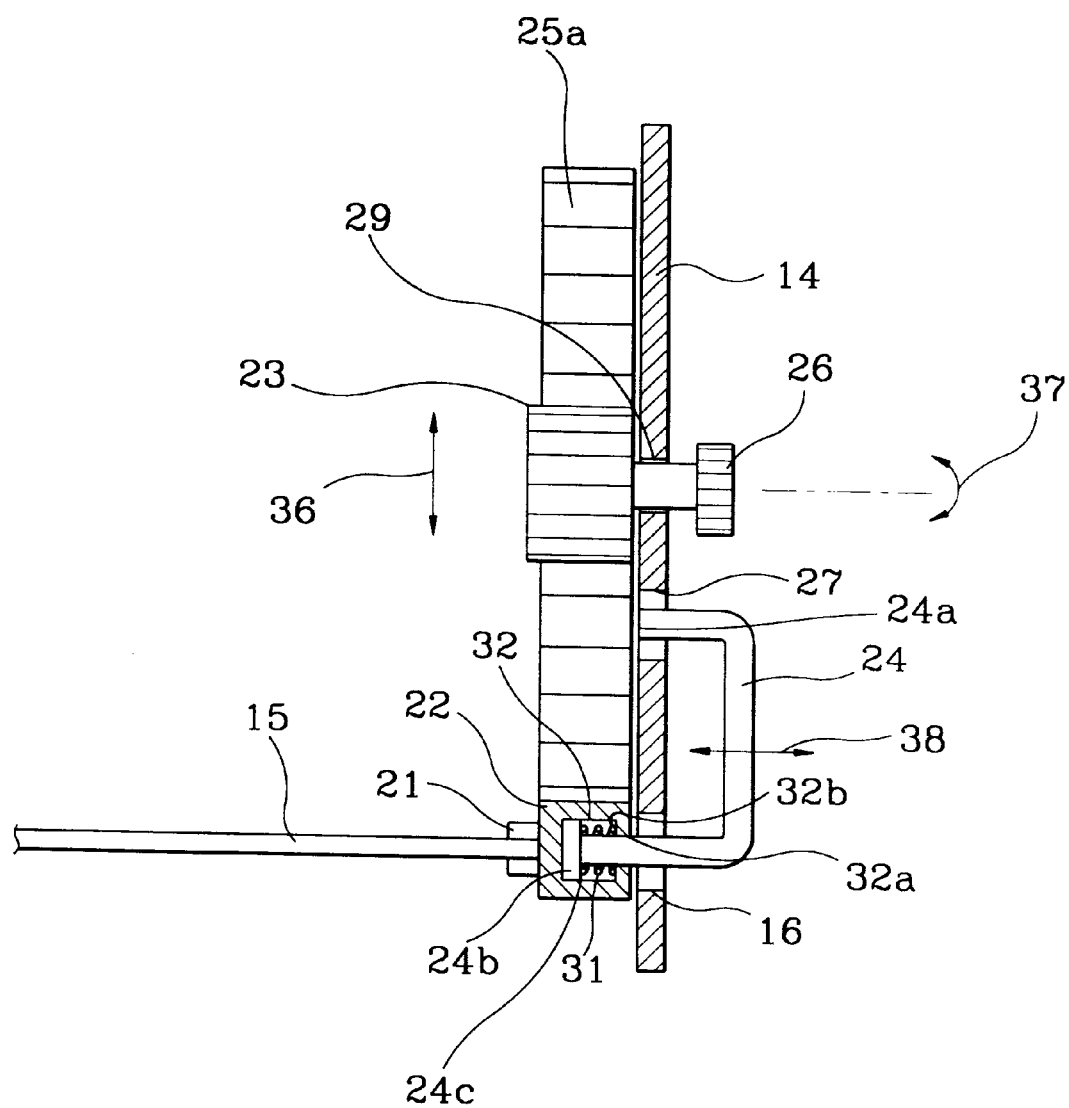
FIG. 5 is a front cross-sectional view illustrating a state that a rack gear and pinion gear of a varying apparatus of a half mirror are engaged according to the present invention.

As shown in FIGS. 4 and 5, the fixing member 20 includes a rack gear 25 formed at an upper portion of each support frame 22, a handle 24 protruded from one side of each of the support frame 22, and a pinion gear 23 engaged with the rack gear 25.

The rack gear 25 is protruded in a vertical direction from an upper portion of the support frame 22. A gear 25a is formed at a lower portion of the same, and the rack gear 25 is engaged with the pinion gear 23. The pinion gear 23 is a dial type gear to which a certain tension force is applied. Therefore, the half mirror may be positioned at a certain portion by rotating the pinion gear 23 in a clockwise direction or a counterclockwise direction. In this state, a tension force is applied, it is possible to support a certain weight.

Referring to FIG. 4, an adjusting knob 26 is integrally engaged with the pinion gear 23. Namely, a through hole 23a is formed at a center portion of the pinion gear 23. A hole 29 is formed at a certain portion of the plates corresponding to the through hole 23a, and the adjusting knob 26 is integrally engaged with the through hole 23a through the hole 29.

Therefore, when rotating the adjusting knob 26 in a first arrow direction 37, the pinion gear 25 is rotated in a second arrow direction 36, and the rack gear 25 is rotated at a certain angle, so that it is possible to accurately control the half mirror 15.

The handle 24 is formed in a channel shape protruded from the support frame 22. One end 24b of the handle 24 is inserted into a cubic space 32 formed in the upper inner portion of the support frame 22 through an inlet hole 32a. In addition, the other end 24a of the handle 24 is protruded to the outside through the guide hole 16 of the casing 11 and is movably inserted into the fixing hole 27 formed at the casing 11.

Therefore, when a user holds the handle 24 and rotates the support frame 22 along the guide hole 16 in an upward and downward direction, the other end 24b of the handle 24 is inserted into the fixing hole 27 for thereby fixing the half mirror 15. After the half mirror 15 is fixed, the adjusting knob 26 is rotated, so that it is possible to accurately adjust the angle of the half mirror 15.

At this time, since the fixing hole 27 is a longitudinal shape, in a state that the handle 24 is inserted into the fixing hole 27, the handle 24 is movable therein for thereby implementing an accurate adjustment. In addition, a spring 31 is engaged in the interior of the cubic space 32. One end of the spring 31 is elastically supported by one side 24c of the end portion 24b of the handle 24, and the other end of the spring 31 is supported by an inner side 32b of the cubic space 32.

Therefore, the spring 31 elastically pushes one end 24b of the handle 24 in an inner direction of the casing 11. In the casing of using the handle 24, the handle 24 is pulled in an outer direction of the casing 11 along a third arrow direction 38.

Figure 6:
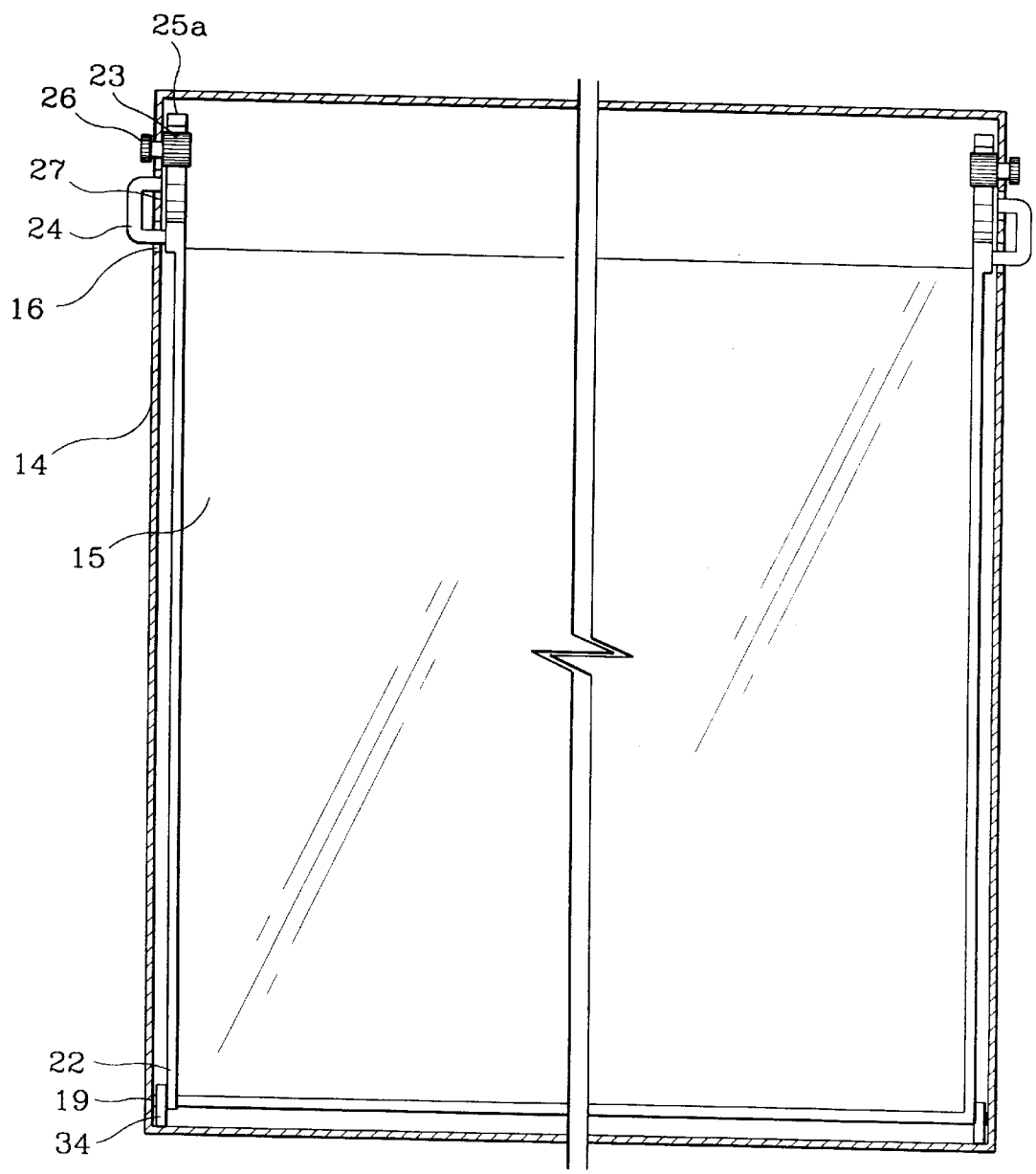
FIG. 6 is a front cross-sectional view illustrating a front portion of a varying apparatus of a half mirror according to the present invention.

As shown in FIG. 6, a hinge shaft 19 is protruded from a lower portion of the support frame 22. In addition, the hinge shaft 19 is hingedly engaged to a support bracket 34 protruded from a lower surface of the casing 11. Therefore, the handle 24 is held and moved in a fourth arrow direction 33 (shown in FIG. 3), the support frame 22 is moved at a certain angle upward or downward about the hinge shaft 19. As a result, the half mirror 15 is moved upward or downward.

In the case of using the half mirror 15, the handle 24 is held and moved upward along the guide hole 16 (shown in FIG. 3), so that the rack gear 25 is engaged with the pinion gear 23. In addition, the adjusting knob 26 is rotated for an accurate adjustment. The other end 24a of the handle 24 (refer to FIG. 5) is fixedly inserted into the fixing hole 27.

In the case that the half mirror 15 is not used, the support frame 22 is moved to the lower potion 16a along the guide hole 16 (refer to FIG. 3), so that it is possible to implement a 2D image apparatus.

The operation of the present invention will be explained with reference to the accompanying drawings. As shown in FIGS. 2 through 6, in the case that a user wishes to use the 3D image displaying apparatus 10 as a 3D image displaying apparatus, the handle 24 is held and pushed upwardly along the fourth arrow direction 33. Therefore, the support frame 22 is rotated in an upward direction about the hinge shaft 19, and the rack gear 25 is moved upwardly along the guide hole 16. At this time, the handle 24 is pulled in an outer direction of the casing 10, so that the other end 24a of the handle 24 does not interfere with the upper portion of the guide hole 16.

The support frame 22 is moved upward, and the other end 24a of the handle 24 is positioned at the fixing hole 27. In this state, when the user stops holding the handle 24, the handle 24 is moved into the interior of the casing 10 by an elastic force of the spring 31. In addition, the other end 24a of the handle 24 is inserted into the fixing hole 27.

At this time, the rack gear 25 is engaged with the pinion gear 23. Therefore, the adjusting knob 26 is rotated, and the pinion hear 23 is rotated at a certain angle along the first arrow direction 37. Therefore, the rack gear 37 engaged to the pinion gear 23 is moved along the second arrow direction 36 for thereby implementing an accurate adjustment. At this time, since the fixing hole is longitudinal, the other end 24a of the handle 24 is movable upward or downward in the interior of the fixing hole 27.

In the case that the 3D image displaying apparatus 10 is used as a 2D image displaying apparatus, a user holds the handle 24 and ejects the same to the outside along the third arrow direction 38. Therefore, the other end 24a of the handle 24 inserted into the fixing hole 27 is removed from the fixing hole. In this state, the user continuously moves the handle 24 in the fourth arrow direction 33.

At this time, the engaged state of the rack gear 25 and the pinion gear 23 is released, and the rack gear 25 is moved downward. In addition, when the handle 24 contacts the lower portion 16a of the guide hole 16, the half mirror 15 maintains a horizontal state. Therefore, the user can use the apparatus as a 2D image displaying apparatus.

As described above, in the present invention, there is an advantage in that the image displaying apparatus according to the present invention may be selectively used as a 2D image displaying apparatus or a 3D image displaying apparatus by moving the displaying apparatus upwardly or downwardly.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A three-dimensional image display apparatus, comprising:

a casing which includes a lower portion for engaging a first image display apparatus, and a rear portion for engaging a second image display apparatus perpendicular to said first image display apparatus;

first and second plates respectively mounted at opposite sides of the casing;

a hinge shaft extending between said first and second plates, an axis of the hinge shaft intersecting each of the first and second plates near a corner of said each of the first and second plates corresponding to an intersection of the lower and rear portions of the casing; and a half-mirror connected to said hinge shaft along a lower edge of the half-mirror, said half-mirror being adjustably mounted in said casing so as to be pivotable about said hinge shaft;

said first plate having a curved guide hole for guiding pivoting of said half-mirror, said apparatus further comprising a handle extending through said curved guide hole; and said handle being formed in a bent shape, and said first plate having a fixing hole near an upper end of said curved guide hole for accepting said handle.

2. The apparatus of claim 1, further comprising:

first and second support frames for supporting said half-mirror, each of said support frames mounted to an edge of said half-mirror between said half-mirror and a corresponding one of said plates, said support frames being mounted to said hinge shaft to form the connection of said half-mirror to said hinge shaft.

3. The apparatus of claim 2, further comprising:

engaging protrusions formed in each of said first and second support frames, said engaging protrusions defining an engaging groove on each of said first and second support frames for receiving a respective edge of said half-mirror.

4. The apparatus of claim 2, wherein said handle is attached to said first support frame, and said second plate has a curved guide hole for guiding pivoting of said half-mirror;

said apparatus further comprising an additional handle attached to said second support frame and extending through said curved guide hole of said second plate.

5. The apparatus of claim 4, said additional handle being formed in a bent shape, and having one end attached to said first support frame and another end pointing back toward said first support frame; and each of said first and a second plates having a fixing hole for accepting said another end of said additional handle.

6. The apparatus of claim 2, said handle having one end and another end, said one end of said handle being elastically mounted to said first support frame for allowing insertion and removal of said another end from said curved guide hole.

7. The apparatus of claim 6, further comprising:

a cubic space formed in a portion of said first support frame for holding said one end of said handle; and a spring engaged in an interior of said cubic space and elastically supported by one side of the cubic space and said one end of said handle for providing elastic mounting of the handle.

8. The apparatus of claim 2, further comprising:

a rack gear protruding from an upper end of said first support frame in a perpendicular direction relative to said first support frame; and a pinion gear for engaging said rack gear, said pinion gear being mounted with tension to said first plate.

9. The apparatus of claim 8, said first plate having a knob hole; and said apparatus further comprising an adjusting knob having a shaft, said adjusting knob being positioned on an outer surface of said first plate, and said shaft penetrating said knob hole and being axially engaged with said pinion gear.

10. The apparatus of claim 9, further comprising a fixing hole which is longitudinal in shape for allowing an end of said handle to be moveable when accepted in said fixing hole.

11. The apparatus of claim 1, said curved guide hole being positioned to allow pivoting of said half-mirror so as to be parallel with said first image display apparatus.

12. The apparatus of claim 1, said fixing hole being longitudinal in shape for allowing an end of said handle to be moveable when accepted in said fixing hole.

13. A three-dimensional image display apparatus, comprising:

a casing which includes a lower portion for engaging a first image display apparatus, and a rear portion for engaging a second image display apparatus perpendicular to said first image display apparatus;

first and second plates respectively mounted at opposite sides of the casing;

a hinge shaft extending between said first and second plates, an axis of the hinge shaft intersecting each of the first and second plates near a corner of said each of the first and second plates corresponding to an intersection of the lower and rear portions of the casing;

a half-mirror connected to said hinge shaft along a lower edge of the half-mirror, said half-mirror being adjustably mounted in said casing so as to be pivotable about said hinge shaft;

first and second support frames for supporting said half-mirror, each of said support frames being mounted to an edge of said half-mirror between said half-mirror and a corresponding one of said plates, said support frames being mounted to said hinge shaft to form the connection of said half-mirror to said hinge shaft;

a rack gear protruding from an upper end of said first support frame in a perpendicular direction relative to said first support frame; and a pinion gear for engaging said rack gear, said pinion gear being mounted with tension to said first plate.

14. The apparatus of claim 13, said first plate having a knob hole; and said apparatus further comprising an adjusting knob having a shaft, said adjusting knob being positioned on an outer surface of said first plate, and said shaft penetrating said knob hole and being axially engaged with said pinion gear.

15. The apparatus of claim 13, said first plate having a curved guide hole for guiding pivoting of said half-mirror, said apparatus further comprising a handle attached to said first support frame and extending through said curved guide hole.

16. The apparatus of claim 15, said handle being formed in a bent shape and having one end of the handle attached to said first support frame and another end of the handle pointing back toward said first support frame; and said first plate having a fixing hole near an upper end of said curved guide hole for accepting said another end of said handle.

17. The apparatus of claim 16, further comprising a fixing hole which is longitudinal in shape for allowing said another end of said handle to be moveable when accepted in said fixing hole.

18. A three-dimensional image display apparatus, comprising:

a casing which includes a lower portion for engaging a first image display apparatus, and a rear portion for engaging a second image display apparatus perpendicular to said first image display apparatus;

first and second plates respectively mounted at opposite sides of the casing;

a hinge shaft extending between said first and second plates, an axis of the hinge shaft intersecting each of the first and second plates near a corner of said each of the first and second plates corresponding to an intersection of the lower and rear portions of the casing; and a half-mirror connected along a lower edge of the half-mirror to said hinge shaft, said half-mirror being adjustably mounted in said casing so as to be pivotable about said hinge shaft;

wherein said second plate has a curved guide hole for guiding pivoting of said half-mirror;

said apparatus further comprising an additional handle attached to said second support frame and extending through said curved guide hole of said second plate;

said additional handle being formed in a bent shape, and having one end attached to a support frame and another end pointing back toward the support frame; and each of said first and a second plates having a fixing hole for accepting said another end of said additional handle.

19. The apparatus of claim 18, further comprising:

first and second support frames for supporting said half-mirror, each of said support frames being mounted to an edge of said half-mirror between said half-mirror and a corresponding one of said plates, said support frames being mounted to said hinge shaft to form the connection of said half-mirror to said hinge shaft.

20. A three-dimensional image display apparatus, comprising:

a casing which includes a lower portion for engaging a first image display apparatus, and a rear portion for engaging a second image display apparatus perpendicular to said first image display apparatus;

first and second plates respectively mounted at opposite sides of the casing;

a hinge shaft extending between said first and second plates, an axis of the hinge shaft intersecting each of the first and second plates near a corner of said each of the first and second plates corresponding to an intersection of the lower and rear portions of the casing; and a half-mirror connected along a lower edge of the half-mirror to said hinge shaft, said half-mirror being adjustably mounted in said casing so as to be pivotable about said hinge shaft;

said first plate having a curved guide hole for guiding pivoting of said half-mirror, said apparatus further comprising a handle attached to said first support frame and extending through said curved guide hole; and said apparatus further comprising a support frame and a handle having one end elastically mounted to said support frame for allowing insertion and removal of said another end of said handle from said curved guide hole.

21. The apparatus of claim 20, said handle being formed in a bent shape, said another end of the handle pointing back toward said support frame, and said first plate having a fixing hole near an upper end of said curved guide-hole for accepting said another end of said handle.

22. The apparatus of claim 20, further comprising:

first and second support frames for supporting said half-mirror, each of said support frames being mounted to an edge of said half-mirror between said half-mirror and a corresponding one of said plates, said support frames being mounted to said hinge shaft to form the connection of said half-mirror to said hinge shaft.

* * * * *